US008367426B2

(12) United States Patent
Adams

(10) Patent No.: US 8,367,426 B2
(45) Date of Patent: Feb. 5, 2013

(54) CHEMICAL SENSOR WITH OSCILLATING CANTILEVERED PROBE

(75) Inventor: Jesse D. Adams, Reno, NV (US)

(73) Assignee: Board of Regents of the Nevada System of Higher Education, On Behalf of the University of Nevada, Reno, Reno, NV (US)

( * ) Notice: Subject to any disclaimer, the term of this patent is extended or adjusted under 35 U.S.C. 154(b) by 0 days.

(21) Appl. No.: 12/416,852

(22) Filed: Apr. 1, 2009

(65) Prior Publication Data

US 2009/0229020 A1 Sep. 10, 2009

Related U.S. Application Data

(63) Continuation of application No. 10/777,282, filed on Feb. 10, 2004, now Pat. No. 7,521,257.

(60) Provisional application No. 60/447,172, filed on Feb. 11, 2003.

(51) Int. Cl.
*G12B 21/08* (2006.01)
*B81B 3/00* (2006.01)
(52) U.S. Cl. ............................. 436/183; 850/33; 438/694
(58) Field of Classification Search .................. 436/184; 850/33; 438/694
See application file for complete search history.

(56) References Cited

U.S. PATENT DOCUMENTS

| | | | |
|---|---|---|---|
| 4,747,698 | A | 5/1988 | Wickramasinghe et al. |
| 5,187,367 | A | 2/1993 | Miyazaki et al. |
| 5,719,324 | A * | 2/1998 | Thundat et al. ............. 73/24.01 |
| 6,386,053 | B1 | 5/2002 | Takeuchi et al. |
| 7,260,980 | B2 | 8/2007 | Adams |
| 7,375,321 | B2 | 5/2008 | Roukes et al. |
| 7,521,257 | B2 | 4/2009 | Adams |
| 7,560,070 | B1 | 7/2009 | Baller et al. |
| 7,694,346 | B2 | 4/2010 | Adams |
| 2003/0032293 | A1 * | 2/2003 | Kim et al. .................... 438/694 |
| 2003/0045019 | A1 | 3/2003 | Kubena |
| 2005/0199047 | A1 | 9/2005 | Adams |
| 2006/0257286 | A1 | 11/2006 | Adams |
| 2009/0229020 | A1 | 9/2009 | Adams |

FOREIGN PATENT DOCUMENTS

| | | |
|---|---|---|
| EP | 0282251 A2 | 9/1988 |
| GB | 2432001 | 4/2009 |
| GB | 2437753 | 4/2009 |

OTHER PUBLICATIONS

Adams, et al, "Taking Atomic Force Microscopy Advances to the University Classroom," *Aerospace Conference, 2001, IEEE Proceeedings* Mar. 10-17, 2001 7:7-3673-7-3682 (2001).
Adams, et al., Office Action Response Regarding U.S. Appl. No. 11/089,559 (Apr. 12, 2007).
Adams, et al., Office Action Response Regarding U.S.Appl. No. 11/089,559 (Nov. 10, 2006).
Adams, et al., Office Action Response Regarding U.S. Appl. No. 11/089,559 (Apr. 13, 2006).

(Continued)

*Primary Examiner* — Krishnan S Menon
*Assistant Examiner* — Rebecca M Fritchman
(74) *Attorney, Agent, or Firm* — Wood, Herron & Evans, L.L.P.

(57) ABSTRACT

The invention provides a method of detecting a chemical species with an oscillating cantilevered probe. A cantilevered beam is driven into oscillation with a drive mechanism coupled to the cantilevered beam. A free end of the oscillating cantilevered beam is tapped against a mechanical stop coupled to a base end of the cantilevered beam. An amplitude of the oscillating cantilevered beam is measured with a sense mechanism coupled to the cantilevered beam. A treated portion of the cantilevered beam is exposed to the chemical species, wherein the cantilevered beam bends when exposed to the chemical species. A second amplitude of the oscillating cantilevered beam is measured, and the chemical species is determined based on the measured amplitudes.

15 Claims, 5 Drawing Sheets

OTHER PUBLICATIONS

Adams, et al., Response to Restriction Requirement Regarding U.S. Appl. No. 11/089,559 (Aug. 19, 2005).

Adams, Office Action Response Regarding U.S. Appl. No. 10/967,748 (Nov. 22, 2006).

Adams, Office Action Response Regarding U.S. Appl. No. 10/967,748 (Mar. 6, 2006).

Adams, Office Action Response Regarding U.S. Appl. No. 10/967,748 (Jul. 11, 2005).

Adams, et al., Response to Office Action Regarding U.S. Appl. No. 11/576,443 (Nov. 28, 2009).

Adams, U.S. Appl. No. 11/845,680, filed Aug. 27, 2007, not yet published.

Adams, U.S. Appl. No. 12/748,788, filed Mar. 29, 2010, not yet published.

Adams, Response to Office Action re U.S. Appl. No. 11/845,661 (Oct. 13, 2010).

Barretino, et al., "CMOS Monolithic Mechatronic Microsystem for Surface Imaging and Force Response Studies," *IEEE Journal of Solid-State Circuits* 40(4):951-959 (Apr. 2005).

Binnig, et al., "Ultrahigh-density Atomic Force Microscopy Data Storage With Erase Capability," *Applied Physics Letters* 74(9):1329-1331 (Mar. 1, 1999).

Boakes, Response to Examination Report, GB Application 0609690.3 (Jul. 7, 2008).

Boakes, Response to Examination Report, GB Application 0609690.3 (Dec. 9, 2008).

Boakes, Response to Examination Report, GB Application 0609690.3 (Feb. 19, 2009).

Boakes, Response to Examination Report, GB Application 0708211 (Feb. 6, 2009).

Bustillo, et al., "Surface Micromachining for Microelectromechanical Systems," *Proceedings of the IEEE* 86(8):1552-1574 (Aug. 1998).

Itoh, et al., "Piezoelectric Cantilever Array for Multiprobe Scanning Force Microscopy," *Micro Electro Mechanical Systems, 1996, MEMS '96, Proceedings, 'An Investigation of Micro Structures, Sensors, Actuators, Machines and Systems'. IEEE, The Ninth Annual International Workshop on* 451-455 (Feb. 11, 1996).

Jones, Examination Report, GB Application 0609690.3 (Jan. 14, 2008).

Jones, Examination Report, GB Application 0609690.3 (Oct. 21, 2008).

Jones, Examination Report, GB Application 0609690.3 (Dec. 22, 2008).

Kim, et al., "Parallel Frequency Readout of an Array of Mass-Sensitive Transducers for Sensor Applications," *Microelectrical Engineering* 53:229-232 (2000).

Liu, et al., "On the Modes and Loss Mechanisms of a High Q Mechanical Oscillator," *Applied Physics Letters* 78(10):1346-1348 (Mar. 5, 2001).

Mathieu, et al., "Piezoresistive Signal Down Mixing for Parallel Detection of Si-based Microcantilevers Resonant Frequencies," *Sensors, 2005 IEEE* 708-711 (Oct. 30, 2005).

Minne, et al., "Parallel Atomic Force Microscopy Using Cantilevers With Integrated Piezoresistive Sensors and Integrated Piezoelectric Actuators," *Applied Physics Letters* 67(26):3918-3920 (Dec. 25, 1995).

Omote, et al., "Temperature Dependence of Elastic, Dielectric, and Piezolectric Properties of 'Single Crystalline' Films of Vinylidene Fluoride Trifluoroethylene Copolymer," *Journal of Applied Physics* 81(6):2760-2769 (Mar. 15, 1997).

Phipps, Examination Report, GB Application 0708212.6 (Apr. 2, 2008).

Phipps, Examination Report, GB Application 0708212.6 (Dec. 9, 2008).

Raevis, Interview Summary Regarding U.S. Appl. No. 11/089,559 (Apr. 13, 2007).

Raevis, Office Action Regarding U.S. Appl. No. 11/845,661 (Sep. 23, 2010).

Sahu, Office Action Regarding U.S. Appl. No. 11/576,443 (May 28, 2009).

Savran, et al.,"Fabrication and Characterization of a Micromechanical Sensor for Differential Detection of Nanoscale Motions," *Journal of Microelectromechanical Systems* 11(6):703-708 (Dec. 2002).

Soderquist, Office Action U.S. Appl. No. 10/967,748 (Feb. 27, 2007).

Sulchek, et al., "Dual Integrated Actuators for Extended Range High Speed Atomic Force Microscopy," *Applied Physics Leiters* 75(11):1637-1639 (Sep. 13, 1999).

Tortonese, et al., "Characterization of Application Specific Probes for SPMs," *Proceedings SPIE* 3009:53-60 (Apr. 1997).

Wolf, et al., "Temperature Dependence of the Piezoelectric Response in Lead Zirconate Titanate Films," *Journal of Applied Physics* 95(3):1397-1406 (Feb. 1, 2004).

Yasumura, et al., "Quality Factors in Micron-and Submicron-Thick Cantilevers," *Journal of Microelectricalmechanical Systems* 9(1):117-125 (Mar. 2000).

Yazdi, et al., "Micromachined Inertial Sensors," *Proceedings of the IEEE* 86(8):1640-1659 (Aug. 1998).

Official Action issued in U.S. Appl. No. 13/350,921, dated Jun. 26, 2012, 16 pages.

Official Action issued in U.S. Appl. No. 11/845,661, dated Sep. 23, 2010.

Official Action issued in U.S. Appl. No. 11/845,661, dated Mar. 22, 2011.

Notice of Allowance issued in U.S. Appl. No. 11/845,661, dated Oct. 22, 2010.

Notice of Allowance issued in U.S. Appl. No. 11/845,661, dated Jul. 6, 2011.

Muro H. et al., Semiconductor or Vibration Sensors Using Multiple Cantilever Beams with Different Lengths, Electronics and Communications in Japan, Part 2, 1991, pp. 109-116, vol. 74, No. 8.

Amrani, M. E. H. et al., Multi-frequency interrogation technique applied to conducting polymer gas and odour sensors, IEE Proceedings—Science, Measurement and Technology, Mar. 1999, pp. 95-101, vol. 146, No. 2.

Maute, M. et al., Fabrication and application of polymer coated cantilevers as gas sensors, Microelectronic Engineering, 1999, pp. 439-442, vol. 46.

Maute, M. et al., Detection of volatile organic compounds (VOC's) with polymer-coated cantilevers, Sensors and Actuators B Chemical, 1999, pp. 505-511, vol. 58.

Keefe, M. H. et al., Mesoporous Thin Films of "Molecular Squares" as Sensors for Volatile Organic Compounds, Langmuir, 2000, pp. 3694-3970, vol. 16.

Kim, B.H. et al., Parallel Frequency Readout of an Array of Mass-Sensitive Tranducers for Sensor Applications, Microelectronic Engineering, 2000, pp. 229-232, vol. 53.

Zambov, L. M. et al., Gas-Sensitive Properties of Nitrogen-Rich Carbon Nitride Films, Advanced Materials, 2000, pp. 656-600, vol. 12, No. 9.

Hagleitner, C. et al., CMOS Single-Chip Multisensor Gas Detection System, The Fifteenth IEEE International Conference on Micro Electro Mechanical Systems, Las Vegas, NV, 2002, pp. 244-247, vol. 2, No. 2.

Djuric, Z. et al., Influence of Adsorption-Desorption Process on Resonant Frequency and Noice of Micro- and Nanocantilevers, 23rd International Conference on Microelectronics, 2002, pp. 243-246, vol. 1.

Belaubre, P. et al., Fabrication of biological microarrays using microcantilevers, Applied Physics Letters, 2003, pp. 3122-3124, vol. 82, No. 18.

Official Action issued in U.S. Appl. No. 11/845,680, mailed Dec. 10, 2010.

Official Action issued in U.S. Appl. No. 11/845,680, mailed Jul. 18, 2011.

Advisory Action issued in U.S. Appl. No. 11/845,680, mailed Oct. 3, 2011, 3 pages.

Official Action issued in U.S. Appl. No. 11/845,661, mailed Oct. 4, 2011, 12 pages.

* cited by examiner

FIG. 2
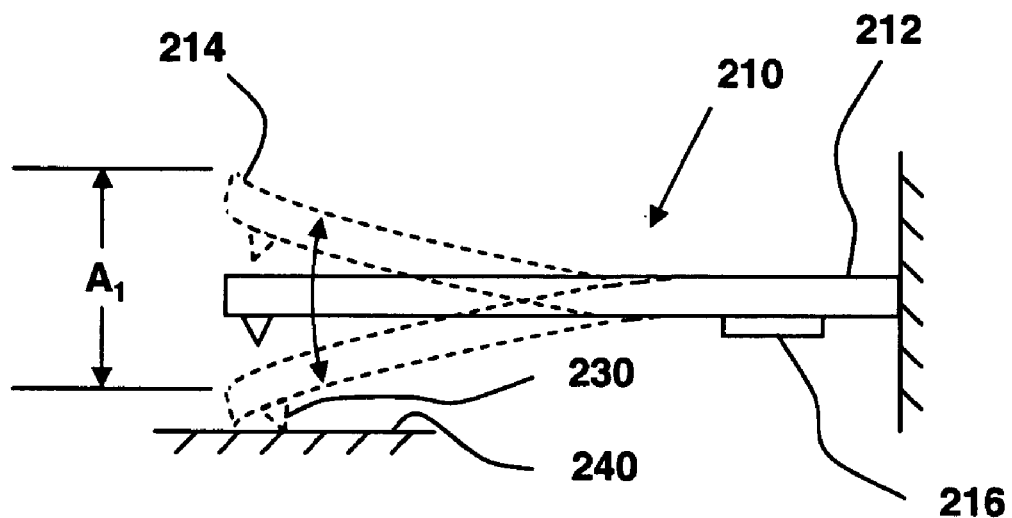
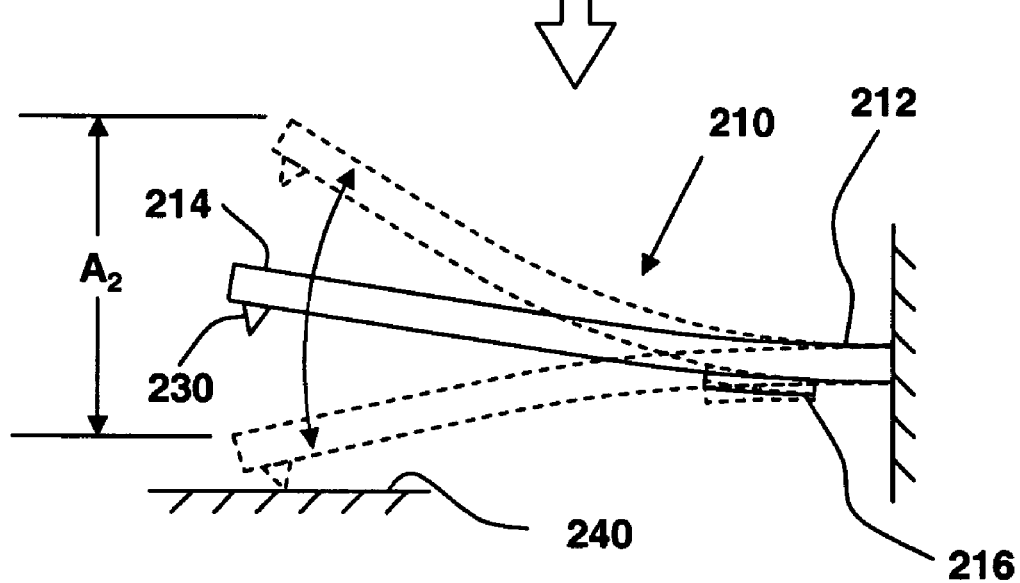

CHEMICAL SENSOR WITH OSCILLATING CANTILEVERED PROBE

CROSS-REFERENCE TO RELATED APPLICATIONS

This application is a Continuation of U.S. patent application Ser. No. 10/777,282, filed Feb. 10, 2004 now U.S. Pat. No. 7,521,257, and entitled "CHEMICAL SENSOR WITH OSCILLATING CANTILEVERED PROBE AND MECHANICAL STOP", which in turn claims the benefit of U.S. Provisional Application No. 60/447,172, filed Feb. 11, 2003.

STATEMENT OF GOVERNMENT RIGHTS

This invention was made with Government support under Contract No. DE-AC05-00OR22725 awarded by the United States Department of Energy to the University of Nevada, Reno and the Government has certain rights in this invention.

FIELD OF THE INVENTION

This invention relates generally to chemical-sensing methods, and in particular, relates to a method and system for sensing specific chemicals and biological materials using a treated cantilever of an atomic force microscope operating in a tapping mode against a mechanical stop.

BACKGROUND OF THE INVENTION

Micromachined cantilevers, as used in atomic force microscopy (AFM), hold promise in chemical-sensing applications, and may become the basis for specialized, ultraminiature, ultrasensitive sensors for detection of specific target chemical species such as chemical compounds, bioactive agents, or toxins. There are increased demands for miniaturized chemical sensors that provide sensitive chemical detection, quality control of materials processing, and measurements of small or limited quantities of a chemical or biological material. Atomic force microscopy, also called scanning force microscope (SFM), is a part of a larger realm of microscopy called scanning probe microscopy. It is being used to solve processing and materials problems in a wide range of technologies affecting the chemical, biological, energy, electronics, telecommunications, automotive, and aerospace industries. Some of the materials being investigated include synthetic and biological membranes, thick and thin film coatings, ceramics, composites, glasses, metals, polymers, and semiconductors. Phenomena such as lubrication, abrasion, corrosion, adhesion, friction, cleaning, polishing, plating and etching are being studied with AFM.

AFM is a method of measuring surface topography on a scale typically from a few angstroms or less to a hundred micrometers or more. The technique involves imaging a sample through the use of a probe or tip suspended from one end of a microcantilever. A surface is probed with the tip, and the interaction between the tip and sample is measured. Physical topography, surface chemistry, charge density, magnetic properties, local temperature and other surface properties can be analyzed.

With an AFM that operates in the contact mode, the surface of a sample is raster scanned by the AFM tip, which is mounted onto the end of a flexible cantilevered beam. The deflection of the cantilever due to tip-surface interaction detects changes in the sample surface. Samples can be analyzed in air, liquids or vacuum. Biological samples have been difficult to scan using contact mode because they are weakly secured to the surface and can be easily scraped off.

With non-contact methods, a tip may be held several nanometers above the surface using a feedback mechanism that measures surface-tip interactions on the scale of nano-Newtons or less. Variations in tip height are recorded while the tip is scanned repeatedly across the sample, producing a topographic image of the surface.

The non-contact mode has been preferred for imaging, because forces on the sample are much lower than in contact mode and less likely to cause damage to soft samples. The cantilever is oscillated close to its resonant frequency at a small distance on the order of one to ten nanometers above the surface. Long-range attractive forces induce changes in the oscillation amplitude, frequency and phase of the cantilever. A constant distance is maintained during scanning.

As an alternative between contact and non-contact modes, the cantilever of the AFM oscillates at its resonant frequency like the non-contact mode, but like the contact mode, it gently taps the surface during a small fraction of its oscillation period, which helps reduce damaging lateral forces. Data may be collected from interactions with surface topography, stiffness, and adhesion as variations in tip height are recorded while the tip is scanned repeatedly across the sample. A three-dimensional topographic image of the surface may be produced from the data. The usual method for displaying the data is to use color mapping for height, for example, black for low features and white for high features.

An AFM operating in a vibrating or tapping mode may use a piezoelectrically actuated microcantilevered probe. Typically, the probe is a micro-electrical-mechanical-system (MEMS) device, micromachined from bulk silicon with a piezoelectric film patterned along a portion of the microcantilever. At the free end of the cantilever is a tip with nanometer-scale radius, optimally shaped to probe the sample surface. The microcantilever is displaced by voltage applied to the piezoelectric actuator, resulting in a controlled vertical movement of the tip. Control electronics drive the microcantilever while simultaneously positioning it vertically to track the sample topography and follow the surface features. A macro-scale position actuator may be used to null the position of the cantilever, following the topology of the sample as the probe is scanned over the surface.

Tapping mode AFM has become an important tool, capable of nanometer-scale resolution on biological samples. The periodic contact with the sample surface minimizes frictional forces, avoiding significant damage to fragile or loosely attached samples.

An AFM can be operated with or without feedback control. Applying feedback can help avoid problems with thermal drift and avoid damage to the tip, cantilever or sample during sample measurement. The AFM may be placed into a constant-height or constant-force mode, which is particularly useful when samples are quite flat and a high-resolution image is needed. With the constant-height mode, the force applied to the sample increases with cantilever deflection, which may result in damage to the tip or the sample. When operated in a constant-force mode of operation, the positioning piezoelectric element moves the sample up and down in response to any changes in detected force. The tip-sample separation is adjusted to restore the force to a pre-determined value. In the constant force mode, however, variations in sample compressibility may yield inconsistent and inaccurate results.

Deflections of the AFM tip can be measured using optical detection methods. Optical sensing of cantilever deflections using a light source with a scanned optical assembly that guides light onto the AFM cantilever, and a photodetector to measure reflected light is disclosed by Prater, et al., in "Scanning Stylus Atomic Force Microscope with Cantilever Tracking and Optical Access," U.S. Pat. No. 6,032,518, issued Mar. 7, 2000.

Oscillating probe tips may be operated in an intermittent mode against a sample to determine surface topology and ascertain physical aspects of the sample surface. An atomic force microscope in which a probe tip is oscillated at a resonant frequency and at a constant amplitude setpoint while scanned across the surface of a sample is disclosed by Elings, et al., in "Tapping Atomic Force Microscope with Phase or Frequency Detection," U.S. Pat. No. 5,519,212, issued May 21, 1996. Tapping mode AFM operation in liquids is discussed by Rogers, et al., in "Tapping Mode Atomic Force Microscopy in Liquid with an Insulated Piezoelectric Microactuator," *Review of Scientific Instruments*, Vol. 73, No. 9, September 2002, pp. 3242-3244.

Self-sensing cantilevered AFM tips with a layer of zinc oxide (ZnO) partially covering a silicon cantilever for combined sensing and actuating in the fundamental and higher order resonant modes is discussed in "Contact Imaging in the Atomic Force Microscope Using a Higher Order Flexural Mode Combined with a New Sensor," *Appl. Phys. Lett.* 68 (10), 4 Mar. 1996, pp. 1427-1429. Lee, et al., also describe a self-sensed SFM tip with a PZT thin film on a silicon dioxide cantilever in "Self-Excited Piezoelectric PZT Microcantilevers for Dynamic SFM—With Inherent Sensing and Actuating Capabilities," *Sensors and Actuators* A72 (1999), pp. 179-188. Minne, et al., describe a cantilever with a tip operating at a higher resonant mode in "Vibrating Probe for a Scanning Probe Microscope," U.S. Pat. No. 6,075,585, issued Jun. 13, 2000. Minne, et al. also describe a cantilever with a piezoelectric drive and a piezoresistive sense in "Cantilever for Scanning Probe Microscope Including Piezoelectric Element and Method of Using the Same," U.S. Pat. No. 5,742,377, issued Apr. 21, 1998.

In non-contact AFM, a cantilevered probe with a piezoelectric film is described by Miyahara, et al., in "Non-Contact Atomic Force Microscope with a PZT Cantilever Used for Deflection Sensing, Direct Oscillation and Feedback Actuation," *Applied Surface Science* 188 (2002), pp. 450-455.

Chemical sensing based on frequency shifts of microcantilevers treated with a compound-selective substance is disclosed by Thundat, et al., in "Microcantilever Sensor," U.S. Pat. No. 5,719,324, issued Feb. 17, 1998. Oscillating silicon nitride cantilevered beams coated with a thin gold film have been used to detect mercury vapor in air due to changes in cantilever resonant frequency and stress levels induced in the gold overlayer as described by Thundat, et al., in "Detection of Mercury Vapor Using Resonating Microcantilevers," *Appl. Phys. Lett.* 66 (13), 27 Mar. 1995, pp. 1695-1697. An uncoated microcantilever can be used for chemical sensing by exciting charge carriers into or out of surface states with discrete photon wavelengths as disclosed by Thundat, et al., in "Uncoated Microcantilevers as Chemical Sensors," U.S. Pat. No. 6,212,939, issued Apr. 10, 2001. Attempts at DNA sequencing and detection using an AFM is described by Allen in "Method and Apparatus for DNA Sequencing Using a Local Sensitive Force Detector," U.S. Pat. No. 6,280,939, issued Aug. 28, 2001.

Current methods for detecting AFM cantilevers generally use optical methods, though these systems require comparably high power, need alignment, have limited resolution, and are prone to drift because of the size of the optical path and the need to retain all parts and optical elements securely coupled to each other. Current systems typically require external lighting for sample illumination and setup, and are not very compact because of the long optical path, the need to have the photodetector at an ample distance from the sample, and constrained viewing and positioning systems for optical alignment. Sample testing in liquids such as water or saline solution presents additional difficulties for optical sensing due to aberrations and refraction of the light beam traversing the fluid.

Piezoresistive sense methods are more compact and may have more resolution than optical systems, though they can self-heat and cause drift. Furthermore, piezoresistive sensing typically consumes large portions of available power when used in a portable device. Piezoelectric devices are generally not selected for static bending measurements due to leakage and charge decay issues of many piezoelectric films. Chemical sensing with static or quasi-static cantilever bending and piezoelectric sensing in response to chemical exposure is difficult due to the minute deflection changes of the cantilever curvature and the tendency of detection systems to drift. A preferred system would not require static curvature measurements.

A compact, beneficial method for sensing chemicals with an AFM cantilever would not require alignment of an external laser and photodetector. Without the laser and photodetector, a chemical-sensing cantilevered system could be more compact. The method would require less power, and generate less heat than other methods. Cantilevers would be small and light, for rapid detection of minute concentrations of target chemicals and biomaterials. Bulky scanning mechanisms would be eliminated. The enclosure would be small, and capable of operating in liquid or gas. Feedback would be readily attained, allowing for parallel probe operation for increased reliability and increased imaging bandwidth. Affects of confounding chemical species such as moisture would be minimized or eliminated. The effects of added mass due to absorption and the effects of surface reactions resulting in altered cantilever stiffness or modifications to stresses on the surface of the cantilever could be detected and sorted to aid in chemical species identification and specificity.

The preferred method would detect quasi-static bending of a cantilever from absorption of material preferentially disposed on the cantilever, could be used with optical, piezoresistive, piezoelectric and other techniques for sensing, and could be used to ascertain cantilever bending without requiring DC or static stability.

It is, therefore, an objective of the present invention to provide a method and system for chemical sensing using cantilevered probes, and to overcome the obstacles and deficiencies described above.

SUMMARY OF THE INVENTION

One aspect of the invention provides a method of detecting a chemical species with an oscillating cantilevered probe. A cantilevered probe is driven into oscillation with a drive mechanism coupled to the cantilevered beam. A free end of the oscillating cantilevered beam is tapped against a mechanical stop coupled to the cantilever. An amplitude of the oscillating cantilevered beam is measured with a sense mechanism coupled to the cantilevered beam. A treated portion of the cantilevered beam is exposed to the chemical species, wherein the cantilevered beam bends when exposed to the chemical species. A second amplitude of the oscillating cantilevered beam is measured with the sense mechanism, and the chemical species is determined based on the amplitude measurements.

The amplitude of the oscillating cantilevered beam may be measured by directing a beam of light onto a surface of the oscillating cantilevered beam, and detecting the beam of light when the light is reflected from the surface of the beam. The amplitude of the oscillating cantilevered beam may be measured by driving the cantilevered beam with a piezoelectric drive-sense mechanism mounted on the cantilevered beam, and measuring a signal from the piezoelectric drive-sense mechanism when the cantilevered beam is oscillating.

A position of the mechanical stop may be adjusted with a positioning element coupled to the mechanical stop to maintain the oscillating cantilevered beam at a nominally constant amplitude, and to determine the chemical species based on the position of the mechanical stop.

A frequency of the oscillating cantilevered beam may be measured with the sense mechanism, and the chemical species may be determined based on the measured frequency. The cantilevered beam may be heated with a heater coupled to the cantilevered beam to initialize the treated portion of the cantilevered beam.

Another aspect of the invention provides a system for sensing a chemical species, including a cantilevered beam with a treated portion, a drive mechanism and a sense mechanism coupled to the cantilevered beam, and a mechanical stop coupled to the base of the cantilevered beam, wherein the cantilevered beam is driven into oscillation and tapped against the mechanical stop by the drive mechanism, and the chemical species is determined based on the oscillation amplitude measured by the sense mechanism when the treated portion of the cantilevered beam is exposed to the chemical species. Another aspect of the invention provides a handheld system for sensing a chemical species. The handheld system includes at least one cantilevered beam, with at least one cantilevered beam having a treated portion. A mechanical stop is coupled to a base end of each cantilevered beam, and a piezoelectric drive-sense mechanism is coupled to each cantilevered beam. The chemical species is sensed based on an oscillation amplitude of each of the cantilevered beams when the treated portion of at least one cantilevered beam is exposed to the chemical species.

BRIEF DESCRIPTION OF THE DRAWINGS

The current invention is illustrated by the accompanying drawings of various embodiments and the detailed description given below. The drawings should not be taken to limit the invention to the specific embodiments, but are for explanation and understanding. The detailed description and drawings are merely illustrative of the invention rather than limiting, the scope of the invention being defined by the appended claims and equivalents thereof. The forgoing aspects and other attendant advantages of the present invention will become more readily appreciated by the detailed description taken in conjunction with the accompanying drawings. Various embodiments of the present invention are illustrated by the accompanying figures, wherein:

FIG. 2 illustrates a pictorial view of an oscillating cantilevered beam with a treated portion before and after exposure to a chemical species, in accordance with one embodiment of the current invention;

DETAILED DESCRIPTION OF THE INVENTION

Figure 1:
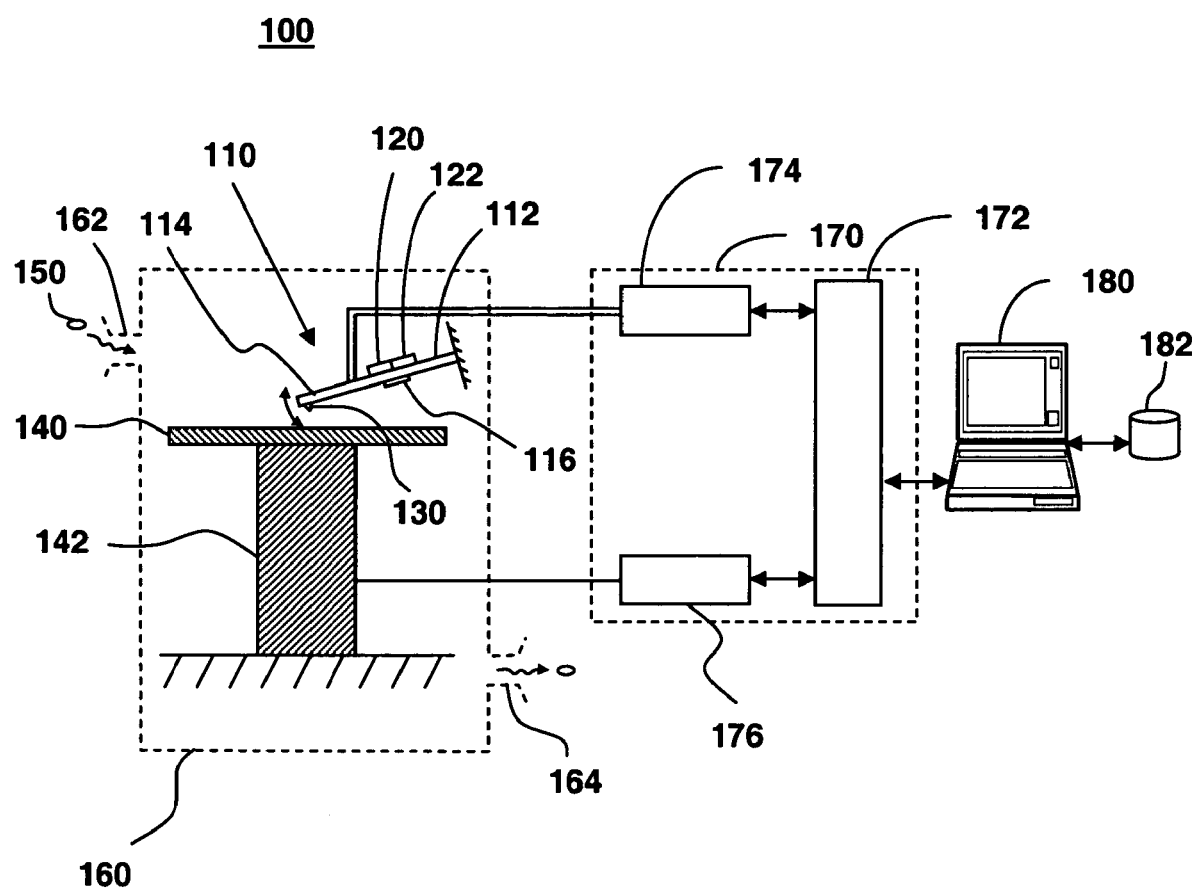
FIG. 1 illustrates a system for sensing a chemical species, in accordance with one embodiment of the current invention.

FIG. 1 illustrates a system for sensing a chemical species, in accordance with one embodiment of the present invention at 100. Chemical-sensing system 100 includes a cantilevered beam 110, a drive mechanism 120 coupled to cantilevered beam 110, a sense mechanism 122 coupled to cantilevered beam 110, and a mechanical stop 140. Cantilevered beam 110 is driven into oscillation with drive mechanism 120, and oscillating cantilevered beam 110 is tapped against mechanical stop 140. Amplitudes of oscillation are measured, and changes in the oscillation amplitude are measured after exposing cantilevered beam 110 to a chemical species 150 to detect or sense the chemical species. Chemical species 150 is determined based on oscillation amplitudes of cantilevered beam 110 measured by sense mechanism 122 when a treated portion 116 of cantilevered beam 110 is exposed to chemical species 150.

Cantilevered beam 110 includes a base end 112 rigidly attached to a support. Cantilevered beam 110 includes a free end 114 opposite base end 112, whereby free end 114 may vibrate up and down about a neutral position while base end 112 remains fixed. Cantilevered beam 110 may comprise a layer of silicon, polysilicon, silicon nitride, a metal film, a metal sheet, a zinc oxide film, a lead-zirconate-titanate (PZT) film, a polymeric layer, or combinations thereof. For example, cantilevered beam 110 may comprise a layer of silicon with a thin layer of zinc oxide or PZT disposed on one side of the silicon layer. Zinc oxide may be deposited on cantilevered beam 110 using, for example, a sputtering process. PZT may be deposited on cantilevered beam 110 using, for example, sol-gel processes. In another example, cantilevered beam 110 comprises a layer of silicon nitride with a patterned piezoelectric film on one side of the silicon nitride layer. Two thin layers of a metal such as gold or platinum are positioned on each side of the patterned piezoelectric film to provide electrical contact to the piezoelectric film. In another example, cantilevered beam 110 comprises a layer of single-crystal silicon, a piezoresistive layer such as polycrystalline silicon, and a dielectric layer such as silicon dioxide positioned between the single-crystal silicon layer and the piezoresistive layer. In another example, a piezoresistor is formed in or near a surface of a single-crystal silicon cantilever. In another example, cantilevered beam 110 comprises a thin piece of metal such as steel upon which a piezoelectric film is deposited. In another example, cantilevered beam 110 comprises a polymeric layer such as polymethylmethacrylate (PMMA), polyimide, or a plastic.

Cantilevered beam 110 includes a treated portion 116. Treated portion 116 may comprise, for example, a selective coating or a patterned film on cantilevered beam 110. Cantilevered beam 110 may comprise, for example, a bimorph cantilevered beam where one layer of the bimorph comprises a silicon layer and the second layer comprises a chemically sensitive material.

Treated portion 116 responds when exposed to a chemical species 150. Treated portion 116 may respond by absorbing, adsorbing, or otherwise reacting to chemical species 150. When exposed to chemical species 150, treated portion 116 may increase or decrease in mass, or become more rigid or less rigid. In one example, treated portion 116 comprises a patterned layer of gold. When exposed to mercury, the two react to form an amalgam. The gold-mercury amalgam adds mass to cantilevered beam 110 and therefore tends to decrease the resonant frequency of cantilevered beam 110. Amalgam formation, however, increases the mechanical stiffness of cantilevered beam 110 thereby increasing its natural resonant frequency. The two effects tend to cancel each other, though one effect can be made dominant by careful selection and placement of treated portion 116 on cantilevered beam 110. Since the layers comprising cantilevered beam 110 are typically thin, any response by treated portion 116 to an exposed chemical species 150 will tend to bend and curl cantilevered beam 110 either up or down. Minimal displacement of free end 114 of cantilevered beam 110 due to bending occurs when a small portion close to free end 114 is treated. Increased displacement of free end 114 of cantilevered beam 110 occurs when treated portion 116 is located near base end 112. Maximum displacement of free end 114 of cantilevered beam 110 occurs when treated portion 116 comprises an entire side of cantilevered beam 110, such as when one side of cantilevered beam 110 is coated with a thin film of gold. Because treating the cantilevered beam symmetrically on both sides tends to negate the bending effects, a treatment of cantilevered beam 110 is generally applied to one side or the other.

Vibrations or oscillations of cantilevered beam 110 tend to occur symmetrically above and below the static displacement profile or neutral position of cantilevered beam 110, whether cantilevered beam 110 is bent upwards, downwards, or is straight. Bending effects with exposure to chemical species 150 tend to occur much slower than individual oscillations of cantilevered beam 110, and are referred to as quasi-static bending.

Treated portion 116 of cantilevered beam 110 may comprise a coating such as, for example, a gold layer, a palladium layer, an alcohol-absorbent polymer, a water-absorbent material, a chemical-sensitive layer, a biosensitive material, or a thiol. Treated portion 116 of cantilevered beam 110 may be selected such that the oscillating cantilevered probe can detect and is sensitive to mercury, hydrogen, an alcohol, water vapor, a chemical element, a chemical compound, an organic material, an inorganic material, a biological material, a DNA strand, a bioactive agent, a toxin, or any such chemical species that can be detected with a treated cantilevered beam. Chemical species refers to any chemical or biological material.

Treated portion 116 of cantilevered beam 110 may comprise, for example, a thin film covering one side of cantilevered beam 110, such as the top or bottom of cantilevered beam 110, or a portion of either side. In one embodiment, treated portion 116 of cantilevered beam 110 comprises a patterned thin film located near base end 112 of cantilevered beam 110. Treated portion 116 of cantilevered beam 110 may be selectively patterned and etched to achieve large displacements with chemical exposure yet allow room for other beam elements such as drive mechanism 120 and sense mechanism 122.

Drive mechanism 120 coupled to cantilevered beam 110 may comprise, for example, a piezoelectric film disposed near base end 112 of cantilevered beam 110. When drive voltages are applied to the piezoelectric film, cantilevered beam 110 bends according to the level of the voltage and the forces and moments generated by the piezoelectric film. When an oscillating voltage is applied to the piezoelectric film, cantilevered beam 110 may be driven at or near a natural resonant frequency and achieve a much larger amplitude than a statically driven beam. The amplitude achieved may depend, for example, on the frequency and mode of oscillation, the internal damping of the beam and applied films, and viscous damping due to gas or liquids surrounding the beam.

Drive mechanism 120 may comprise any suitable actuation mechanism such as, for example, a piezoelectric drive, an electrostatic drive, a thermal drive, a magnetic drive, or other suitable drive mechanism as is known in the art. Drive mechanism 120 and sense mechanism 122 may comprise, for example, a unitary piezoelectric element coupled to the cantilevered beam.

Sense mechanism 122 generates a signal based on the static and dynamic deflections of cantilevered beam 110. The generated signals may be used to determine oscillation amplitudes and frequencies of cantilevered beam 110. A piezoelectric film such as a zinc oxide film or a PZT layer may be used to generate a signal when cantilevered beam 110 is displaced or vibrated. The same piezoelectric film may be used to drive cantilevered beam 110 into oscillation as well as to sense the displacements, sometimes referred to as self-sensing.

Sense mechanism 122 may comprise, for example, a piezoelectric sense mechanism, an optical sense mechanism, a piezoresistive sense mechanism, an electrostatic or capacitive sense mechanism, a magnetic sense mechanism, or any suitable sense mechanism as is known in the art. Sense mechanism 122 may comprise, for example, a light source for directing a beam of light onto the cantilevered beam and a photodetector for detecting the beam of light reflected from the cantilevered beam, whereby frequencies and amplitudes of oscillations can be measured with the photodetector. Other optical sense mechanisms may be employed, such as diffraction gratings attached to free end 114, or interferometric techniques between a surface of cantilevered beam 110 and a reference optical surface.

A probe tip 130 may be attached to free end 114 of cantilevered beam 110 to tap against mechanical stop 140 when cantilevered beam 110 is oscillated. Probe tip 130 may be integrally formed, for example, from thin films comprising cantilevered beam 110 such as a silicon nitride film deposited conformally onto a silicon wafer surface and into an etch pit formed in the silicon wafer surface, wherein the silicon nitride film is subsequently patterned and etched to form a cantilevered beam with an integral silicon nitride tip. In another example, probe tip 130 may be formed from silicon or silicon dioxide by selective patterning and etch back steps as is known in the art. In another example, a monolithic probe tip 130 is attached to cantilevered beam 110 using micromanipulators and standard adhesives. Probe tip 130 may be formed from tungsten, carbon nanotubes, diamond, or any relatively hard material that can be formed into a tip or a small-diameter cylinder and formed on or attached to cantilevered beam 110. Probe tip 130 provides a small, pointed, contact surface for tapping against mechanical stop 140 when cantilevered beam 110 is oscillated. A small contact surface is generally desired to minimize stiction or other forces that may cause probe tip 130 to inadvertently stick to mechanical stop 140.

Mechanical stop 140 is coupled to base end 112 of cantilevered beam 110. Mechanical stop 140 provides a reference surface for repetitive strikes from cantilevered beam 110. Although repetitive strikes may be made from the tip of free end 114 of cantilevered beam 110, a presently preferred embodiment entails a tip of probe tip 130 repetitively striking or tapping against mechanical stop 140.

Mechanical stop 140 comprises a smooth, relatively hard surface for tapping by cantilevered beam 110. For example, a portion of a polished silicon wafer, a smooth glass plate, a mica surface, a smooth alumina surface, or a ground and polished metal plate may form the contact surface of mechanical stop 140. Mechanical stop 140 may include a positioning element 142 coupled between mechanical stop 140 and base end 112 of cantilevered beam 110.

Positioning element 142 provides the ability to position mechanical stop 140 at a suitable location for striking by cantilevered beam 110. Translational movements may be provided with translation actuators such as screw drives, linear actuators, or piezoelectric actuators in one or more directions. Mechanical stop 140 may be coarsely adjusted by positioning element 142 to engage cantilevered beam 110 into a tapping mode. Mechanical stop 140 may be finely adjusted by positioning element 142 to maintain an oscillation of cantilevered beam 110 at a nominally constant amplitude. Positioning element 142 may comprise, for example, a piezotube or other suitable positioning mechanism for providing fine positioning of mechanical stop 140 with respect cantilevered beam 110. Although illustrated with a direct attachment to mechanical stop 140, positioning element 142 may alternatively be coupled directly to base end 112 of cantilevered beam 110. Cantilevered beam 110, mechanical stop 140 and positioning element 142 may be enclosed inside an enclosure 160.

Enclosure 160 includes an inlet port 162 and an outlet port 164 for the ingression and egression of chemical species 150 and any liquid or gas carriers for chemical species 150. Enclosure 160 may be formed from plastic, metal, or any suitable material for housing cantilevered beam 110 and mechanical stop 140. Pumps, valves, or other fluidic control devices may be included to aid in the transport of chemical species 150 to and from treated portion 116 of cantilevered beam 110. Enclosure 160 may also contain suitable connectors, lenses, mirrors, photodetectors and other elements for controlling and monitoring the oscillating cantilevered probe. Control and monitoring of the oscillating cantilevered probe and positioning elements may be done with oscillating cantilevered beam control circuitry 170. Enclosure 160 may include filters, scrubbers, and other media treatment elements to aid in the detection of chemical species 150.

Cantilevered beam control circuitry 170 comprises circuits and electronic devices to drive cantilevered beam 110 into oscillation and to measure amplitudes of the oscillating cantilevered beam 110. Control circuitry 170 may include, for example, a controller 172 and drive-sense circuitry 174. Controller 172 and drive-sense circuitry 174 cooperate to drive cantilevered beam 110 into oscillation using any suitable drive mechanism 120 such as a piezoelectric drive, an electrostatic drive, a thermal drive, or a magnetic drive. Controller 172 and drive-sense circuitry 174 cooperate to measure amplitudes of oscillating cantilevered beam 110 with any suitable sense mechanism 122 such as an optical sense mechanism, a piezoelectric sense mechanism, a piezoresistive sense mechanism, a capacitive sense mechanism, or a magnetic sense mechanism.

Control circuitry 170 may include, for example, controller 172 and drive-sense circuitry 174 that contain suitable electronic circuits to drive cantilevered beam 110 into oscillation with a piezoelectric drive mechanism 120 mounted on cantilevered beam 110, and to measure a signal from a separate piezoelectric sense mechanism 122 when cantilevered beam 110 is oscillating.

In another example, control circuitry 170 includes controller 172 and drive-sense circuitry 174 that drive cantilevered beam 110 into oscillation with a piezoelectric sense mechanism 122 mounted on cantilevered beam 110, along with electronic circuits for directing a beam of light onto a surface of oscillating cantilevered beam 110 and to detect the reflected beam of light when the beam of light is reflected from the surface of the oscillating cantilevered beam 110.

In another example, control circuitry 170 includes controller 172 and drive-sense circuitry 174 that drive cantilevered beam 110 into oscillation with a unitary piezoelectric element mounted on cantilevered beam 110, and senses oscillation amplitudes of cantilevered beam 110 with the same unitary piezoelectric element.

In another example, control circuitry 170 includes controller 172 and drive-sense circuitry 174 that drive cantilevered beam 110 into oscillation with an electrostatic actuator coupled to cantilevered beam 110 and senses oscillation amplitudes of cantilevered beam 110 with a piezoresistor formed in cantilevered beam 110.

Control circuitry 170 may also include positioning circuitry 176 to adjust the position of mechanical stop 140 when engaging the cantilevered probe and when operating oscillating cantilevered beam 110 in an open-loop or closed-loop mode. Control circuitry 170 may have an interface to a control computer 180.

Control computer 180 interfaces with control circuitry 170 to control the operations and functions of chemical-sensing system 100. Control computer 180 includes a processor, memory, timing circuits, and suitable hardware and software to run control applications for chemical-sensing system 100. Control computer 180 may be, for example, a personal computer (PC) or a personal desk assistant (PDA) with a suitable keyboard, voice recognition software, or other input devices for selecting operations and functions of chemical-sensing system 100. Control computer 180 may include any suitable display such as a flat panel display, a liquid crystal display (LCD) or a monitor to display operations, functions and results obtained from chemical-sensing system 100. Control computer 180 may include or have access to a database 182 for collecting, analyzing, and storing data from chemical-sensing system 100. Control computer 180 may contain suitable hardware and software to determine chemical species 150 based on oscillation amplitudes or measured frequencies of cantilevered beam 110, or based on the position of mechanical stop 140. Control computer 180 may be networked.

Although chemical-sensing system 100 is depicted as an adaptation of an AFM, the present invention does not require a scanning system for cantilevered beam 110, nor are samples required for operation. Tapping is generally done in one place. Scanning may be done to locate a suitable position on mechanical stop 140 to tap against. For portable systems, the scanning and sample placement systems can be omitted. In one alternative embodiment, chemical-sensing system 100 may be used in a dual mode as an AFM and as a chemical sensor.

FIG. 2 shows a pictorial view of an oscillating cantilevered beam with a treated portion before and after exposure to a chemical species, in accordance with one embodiment of the present invention at 200. Oscillating cantilevered beam 200 includes a cantilevered beam 210 with a base end 212 attached to a nominally rigid support, and a free end 214 opposite base end 212 that is free to vibrate and oscillate about the neutral position of cantilevered beam 210. The neutral position of cantilevered beam 210 is the position that each point of cantilevered beam 210 takes when cantilevered beam 210 is not oscillating or vibrating.

Cantilevered beam 210 may initially be straight or have some minor curvature due to processing or due to effects of treated portion 216 on a surface of cantilevered beam 210. When treated portion 216 is exposed, for example, to a chemical species that reacts with it, treated portion 216 may expand or contract, causing bending of cantilevered beam and a change in the neutral position. A slight curvature, for example, induced by an enlargement of treated portion 216 located near base end 212 of cantilevered beam 210 when exposed to a chemical species, will result in a deflection shift at free end 214 of cantilevered beam 210. Slowly changing or quasi-static displacements of cantilevered beam 210 occur when deflections of cantilevered beam 210 change slowly with exposure to a chemical species or with slow changes in the concentration of the chemical species in the measurement medium. Changes are considered slow when the time frame for the change is longer than the period of vibration.

Static displacements may be measured optically or with strain-sensitive elements positioned on cantilevered beam 210. Static displacements can be measured electrostatically or magnetically. Generally, static displacements are difficult to measure with piezoelectric sense mechanisms because of the gradual decrease or bleed-off of charge generated when the piezoelectric material is strained. However, dynamic displacements are readily measured with piezoelectric films, particularly if the frequency of vibration is appreciably faster than the decay rate of generated charge. Oscillating or vibrating cantilevered beam 210 creates a charge that can be detected, for example, with a charge amplifier, a transimpedance amplifier, or an AC bridge circuit that generates an output voltage providing a measure of the oscillation amplitude. The output voltage can also be used to measure a frequency of one or more resonant modes of the oscillating cantilevered beam when cantilevered beam 210 is oscillated. Static or quasi-static displacements of the neutral position of cantilevered beam 210 due to chemical exposure, however, are difficult to measure with a piezoelectric sense mechanism even with dynamic oscillations without providing a reference surface.

A reference surface may be provided by mechanical stop 240. Mechanical stop 240 is initially positioned such that free end 214 of cantilevered beam 210 or a probe tip 230 attached near free end 214 of cantilevered beam 210 strikes the stop when oscillating. Mechanical stop 240 may be positioned, for example, such that cantilevered beam 210 lightly or heavily taps mechanical stop 240.

In one example of an open-loop operating mode, cantilevered beam 210 is positioned such that cantilevered beam 210 taps against mechanical stop 240 over significant portions of each tapping cycle when no chemical species are present. As cantilevered beam 210 is exposed to the chemical species, treated portion 216 causes bending of cantilevered beam 210 away from mechanical stop 240, resulting in a larger amplitude of oscillation. As cantilevered beam 210 pulls away from mechanical stop 240, the position of mechanical stop 240 may be reset or repositioned.

In another example of an open-loop operating mode, cantilevered beam 210 lightly taps mechanical stop 240 when no chemical species are present, with assumed oscillation amplitude A1. As cantilevered beam 210 is exposed to the chemical species, treated portion 216 causes bending of cantilevered beam 210 from the initial neutral position and drives probe tip 230 harder into mechanical stop 240, resulting in a smaller amplitude of oscillation. The amplitude of oscillation is dynamically measured to determine the quasi-static bending of the beam and to determine the presence and concentration of the chemical species.

In another operating mode, exposure to the chemical species causes bending of cantilevered beam 210 from the neutral position and drives probe tip 230 away from mechanical stop 240. In this mode, the oscillation amplitude A2 of cantilevered beam 210 is increased by increasing the drive voltage until oscillating cantilevered beam 210 again taps mechanical stop 240. The amplitude of oscillation is dynamically measured to determine the quasi-static bending of the beam and to determine the chemical species. The drive voltage provides a measure of the oscillation amplitude.

In one example of a closed-loop operating mode, cantilevered beam 210 is set to tap mechanical stop 240 at a first amplitude A1 when no chemical species are present. As treated portion 216 of cantilevered beam 210 is exposed to the chemical species, quasi-static deformation of the initial neutral position occurs, resulting in a shift of the center of the vibrations. The position of mechanical stop 240 may be adjusted to maintain oscillating cantilevered beam 210 at a constant amplitude A1 where free end 214 or probe tip 230 of cantilevered beam 210 continues to tap mechanical stop 240, and a measure of the amplitude of bending of can be obtained, for example, from measuring the position of the mechanical stop or from a control voltage used to control the positioning mechanism.

Figure 3:
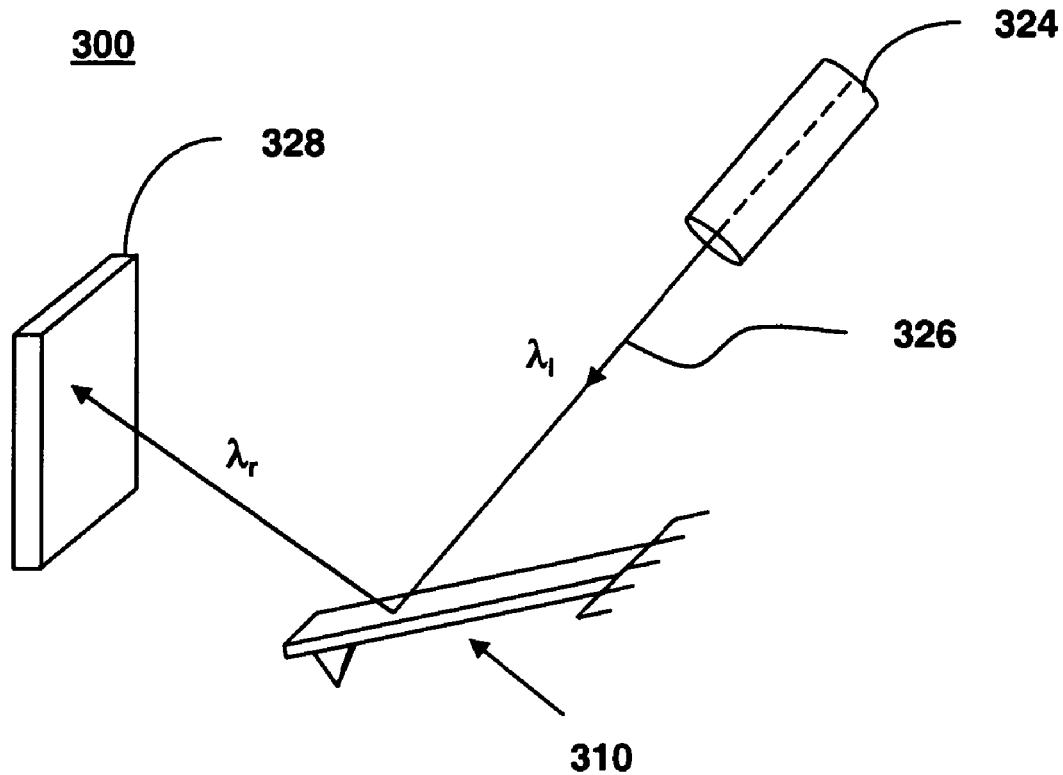
FIG. 3 illustrates a schematic diagram of an oscillating cantilevered beam with an optical sense mechanism, in accordance with one embodiment of the current invention.

FIG. 3 shows a schematic diagram of an oscillating cantilevered beam with an optical sense mechanism, in accordance with one embodiment of the present invention at 300. Optical sense mechanism 300 includes a light source 324 for emitting a beam of light 326 and a photodetector 328 for detecting beam of light 326 when reflected from an oscillating cantilevered beam 310. Light source 324 and associated optics such as mirrors and lenses direct beam of light 326 onto a surface of cantilevered beam 310. Light source 324, for example, may comprise a laser or a laser diode and collimating lenses for generating a well-defined light beam. Beam of light 326, for example, may comprise coherent laser light at a predefined wavelength that is focused and positioned near the free end of cantilevered beam 310. Photodetector 328 may comprise, for example, a position-sensitive detector (PSD), a photodiode, a photodiode array, or a photodetector array. Photodetector 328 may include a filter, for example, that filters out stray light and transmits light from beam of light 326. Photodetector 328 detects reflected beam of light 326 and provides a measure of the oscillation amplitude of cantilevered beam 310 by detecting changes in position and in light intensity of the reflected light.

Figure 4:
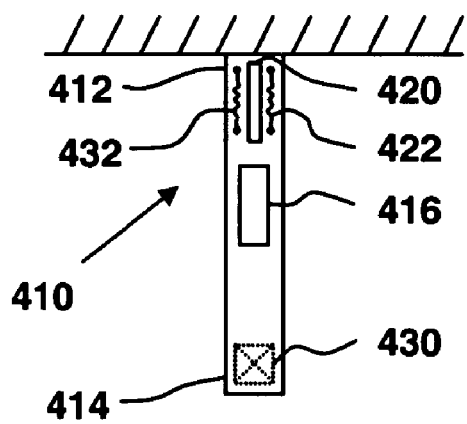
FIG. 4 illustrates a top view of a cantilevered beam for sensing a chemical species, in accordance with one embodiment of the current invention.

FIG. 4 shows a top view of a cantilevered beam for sensing a chemical species, in accordance with one embodiment of the present invention at 400. Cantilevered beam probe 400 comprises a cantilevered beam 410 with a base end 412 and a free end 414, and a treated portion 416 on a surface of cantilevered beam 410.

A drive mechanism 420 is coupled to cantilevered beam 410. Drive mechanism 420 may comprise, for example, a patterned thin film of zinc oxide or PZT on a surface of cantilevered beam 410. A sense mechanism 422 is also coupled to cantilevered beam 410. Sense mechanism 422 may comprise, for example, a piezoresistor attached to or formed in cantilevered beam 410. A probe tip 430 may be attached to free end 414 of cantilevered beam 410. Probe tip 430 may be tapped against a mechanical stop when the cantilevered beam is oscillated. A probe heater 432 may be coupled to cantilevered beam 410. Probe heater 432 may comprise, for example, a resistive heater formed in or on cantilevered beam 410. Probe heater 432 may be used to heat the cantilevered beam to an elevated temperature to initialize or re-initialize treated portion 416. Alternatively, an external heater such as a heat lamp or a hot gas system may be used to heat and re-initialized cantilevered beam 410. Chemical re-initialization may be accomplished, for example, using cleaning processes such as wiping or solvent exposure, or by reversing any chemical reactions that occurred to treated portion 416. Cantilevered beam 410 may have a rectangular shape, though other shapes may be suitably used such as a pointed cantilever, a V-shaped cantilever, a triangular-shaped cantilever, or a dual-arm cantilever. Cantilevered beam 410 may be arranged in an array of cantilevered beams, the cantilevers being all identical, all different, or some combination thereof. An array of cantilevered beams 410 may be attached to a common base. The array of cantilevered beams 410 may be driven and sensed, for example, with a unitary piezoelectric element coupled to each cantilevered beam. In one embodiment, the unitary piezoelectric elements in the array may be connected in series. The series-connected piezoelectric elements in the array may be driven with as few as two electrical connections to the piezoelectric element array. In this case, scanning the drive voltage through a range of frequency can excite and sense one beam at a time, allowing interrogation of any beam in the array while minimizing the number of electrical connections required. In another configuration, the piezoelectric elements in the array are connected in parallel, such that as few as two electrical connections may be used to drive and sense the beams and that failure of one beam does not prevent others from operating. In another configuration, the array of piezoelectric elements is connected in a series-parallel arrangement.

In an alternative embodiment, cantilevered beam 410 is attached at each end, with the center of cantilevered beam 410 free to vibrate. Probe tip 430 may be attached at or near the center of the beam. In another embodiment, cantilevered beam 410 is attached on all sides in a diaphragm or membrane configuration, with probe tip 430 located at or near the center of the diaphragm. In another embodiment, cantilevered beam 410 in a cantilevered, doubly-supported or diaphragm configuration, has two or more probe tips 430. Multiple probe tips may be used, for example, to preferentially excite specific resonant modes or to provide additional information for chemical or biological material detection.

Figure 5:
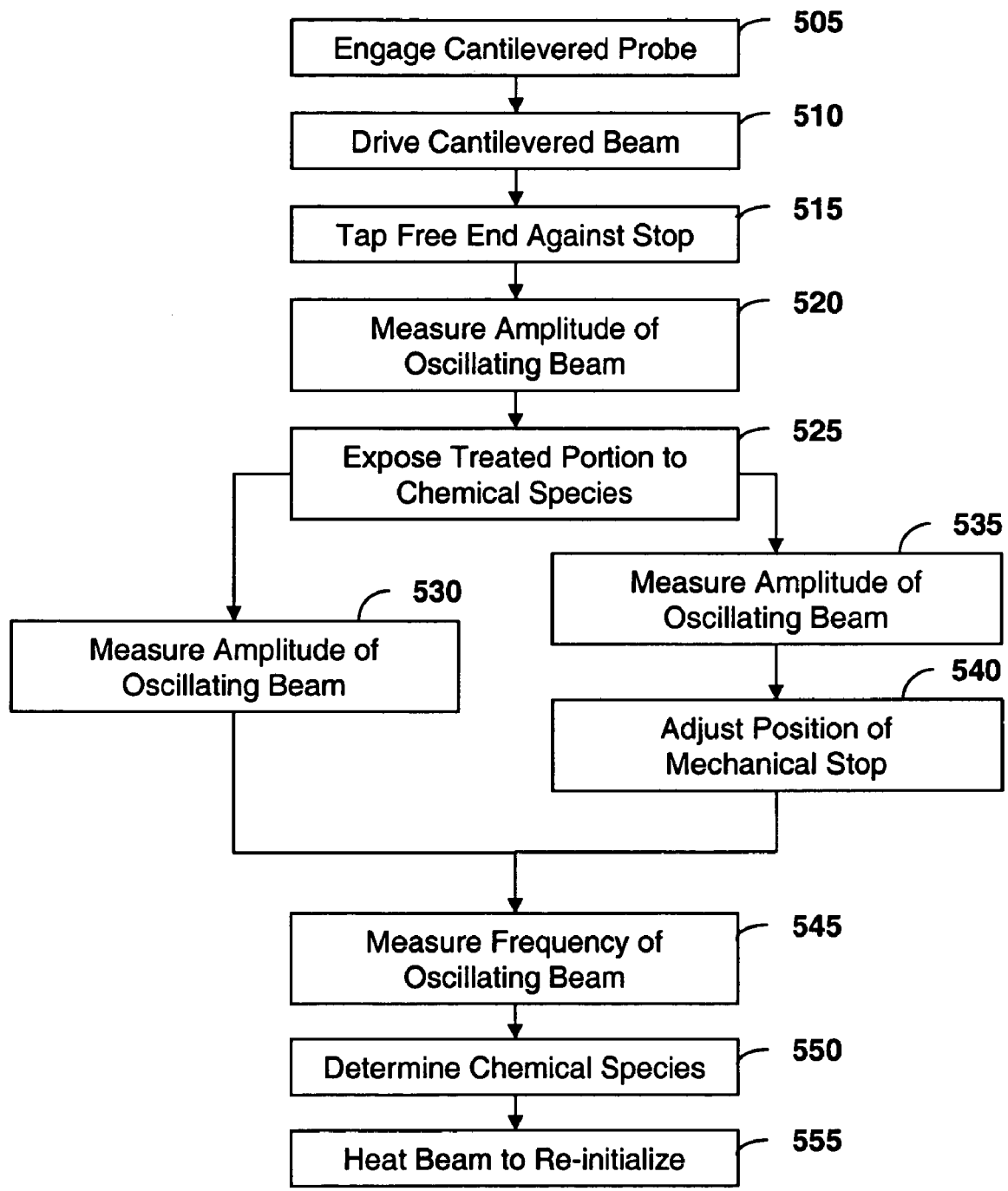
FIG. 5 illustrates a flow diagram of a method of detecting a chemical species with an oscillating cantilevered probe, in accordance with one embodiment of the current invention.

FIG. 5 shows a flow diagram of a method of detecting a chemical species with an oscillating cantilevered probe, in accordance with one embodiment of the present invention at 500. Chemical species detection method 500 comprises steps to detect a chemical species with an oscillating cantilevered probe.

A cantilevered beam is engaged, as seen at block 505. The cantilevered beam may be engaged, for example, by driving the cantilevered beam into oscillation and adjusting a reference surface until the oscillating cantilevered beam taps the reference surface at a predefined amplitude. The cantilevered beam may be engaged, for example, by driving the cantilevered beam into oscillation and adjusting the position or angle of the base of the beam until the oscillating cantilevered beam taps the reference surface. The cantilevered beam may be engaged, for example, by positioning the beam or the reference surface, also referred to as a mechanical stop, and then pulling the beam a predefined distance away from the mechanical stop prior to exciting the beam to a predefined amplitude.

The cantilevered beam is driven into oscillation, as seen at block 510. The cantilevered beam is driven by a drive mechanism coupled to the cantilevered beam. The drive mechanism may comprise, for example, a piezoelectric drive, an electrostatic drive, a thermal drive, or a magnetic drive. The cantilevered beam may be driven, for example, with a piezoelectric drive-sense mechanism such as a zinc oxide or PZT film mounted on the cantilevered beam. The cantilevered beam may be driven into oscillation at its fundamental resonant frequency, for example, or at a higher resonant frequency corresponding to a higher order resonant mode. The cantilevered beam may be driven, for example, at or near a resonant frequency or at an off-resonance frequency. The amplitude of oscillation may be controlled, for example, by the amplitude of the drive signal applied to the drive mechanism.

The free end of the cantilevered beam is tapped against the mechanical stop, as seen at block 515. The mechanical stop is coupled to a fixed or base end of the cantilevered beam. The cantilevered beam or the mechanical stop may be positioned such that the free end of the cantilevered beam lightly strikes the mechanical stop, or such that a probe tip attached near the free end of the cantilevered beam lightly strikes the mechanical stop.

An amplitude of oscillation is measured with a sense mechanism coupled to the cantilevered beam, as seen at block 520. The sense mechanism may comprise, for example, an optical sense mechanism, a piezoelectric sense mechanism, a piezoresistive sense mechanism, a capacitive sense mechanism, or a magnetic sense mechanism. An amplitude of the oscillating cantilevered beam may be measured, for example, by directing a beam of light from a light source onto a surface of the oscillating cantilevered beam and detecting the beam of light when the beam of light is reflected from the surface of the oscillating cantilevered beam, such as with a photodetector or a photodetector array. In another example, an amplitude of the oscillating cantilevered beam may be measured by driving the cantilevered beam into oscillation with a piezoelectric drive-sense mechanism mounted on the cantilevered beam, and measuring a signal from the piezoelectric drive-sense mechanism when the cantilevered beam is oscillating. In another example, the cantilevered probe may be brought into intermittent contact with the reference surface. The root-means-square (rms) amplitude of the AC voltage generated by the cantilever's integrated piezoelectric film is proportional to the oscillation amplitude of the cantilever. When the cantilevered beam is intermittently contacting the surface, the oscillation amplitude can be compared to a set-point amplitude and maintained at a specified value by a feedback loop through the drive circuit. Exposing the cantilevered beam to a target chemical species causes the cantilevered beam to bend up and away from the reference surface on which it taps. The feedback loop responds by moving the surface vertically using a piezotube or other positioning element until the specified cantilevered amplitude is restored. The piezotube response is monitored with data acquisition hardware and software.

A treated portion of the cantilevered beam is exposed to a chemical species, as seen at block 525. The chemical species may include, for example, mercury, hydrogen, an alcohol, water vapor, a chemical element, a chemical compound, an organic material, an inorganic material, a biological material, a DNA strand, a bioactive agent, or a toxin. The treated portion of the cantilevered beam may comprise, for example, a patterned gold layer, a palladium layer, an alcohol-absorbent polymer, a water-absorbent material, a chemical-sensitive layer, a biosensitive material, or a thiol. The treated portion of the cantilevered beam may be, for example, on the topside or underside of the cantilevered beam. When the treated portion of the cantilevered beam is exposed to the chemical species, the treated portion reacts or responds to stiffen or lessen the stiffness of the cantilevered beam to change its resonant frequency, to add mass to or subtract mass from the cantilevered beam to change its resonant frequency, to stress the cantilevered beam and cause it to bend or curve quasi-statically from its initial neutral position, or some combination thereof.

When operating in an open-loop mode, a second amplitude of the oscillating cantilevered beam is measured with the sense mechanism, as seen at block 530. The amplitude may be measured, for example, by detecting the maximum peak-to-peak amplitude of the free end as the cantilevered beam slowly bends towards the mechanical stop when exposed to the chemical species. Alternatively, the amplitude may be measured by increasing or decreasing the amplitude of the drive voltage such that the cantilevered beam lightly taps the mechanical stop, and measuring the amplitude based on the drive voltage. An electronic filter may be used, for example, to filter out the DC signal and any AC signals except the drive frequency of the beam to increase the signal-to-noise ratio and to limit low-frequency 1/f noise.

When operating in a closed-loop mode, a second amplitude of the oscillating is measured with the sense mechanism, as seen at block 535. As the second amplitude varies from the first due to exposure of the treated portion to the chemical species, feedback signals are applied to a positioning element, and the position of the mechanical stop may be adjusted, as seen at block 540. The position of the mechanical stop may be adjusted with a positioning element coupled to the mechanical stop to maintain the oscillating cantilevered beam at a nominally constant amplitude, and the quasi-static bending of the cantilevered beam can be measured based on the position of the mechanical stop. An electronic filter may also be used in the closed-loop mode to filter out the DC signal and any AC signals except the drive frequency of the beam to increase the signal-to-noise ratio and to limit low-frequency 1/f noise.

The frequency of the oscillating cantilevered beam may be impacted by the interaction between the chemical species and the treated portion of the cantilevered beam. The frequency of the oscillating cantilevered beam may optionally be measured with the sense mechanism coupled to the cantilevered beam, as seen at block 545. The fundamental resonant frequency of the oscillating cantilevered beam may be measured, or a suitable overtone such as the second or third mode may be measured. Oscillation frequencies may be determined from amplitude measurements taken as a function time. Phase information may also be extracted from the amplitude information by comparing the amplitude information to reference signals from, for example, the drive signal.

The chemical species may be determined, as seen at block 550. In one example, the chemical species may be determined to be absent or present. In another example, the concentration of the species may be determined. In another example, a particular type of chemical species may be detected and quantified according to the specificity of the treated portion. The chemical species may be determined, for example, based on the first amplitude and the second amplitude when operating in an open-loop mode. In another example, the chemical species may be determined based on the position of the mechanical stop when operating in a closed-loop mode. In another example, the chemical species may be determined based on the measured frequency of the oscillating cantilevered beam, such as the fundamental frequency or an overtone.

The chemical species may be determined continuously, for example, when the treated portion responds continuously to the composition and the concentration of the exposed chemical species. In another example, the concentration of the chemical species may be determined at its peak value, such as when the treated portion of the cantilevered beam does not respond reversibly when the chemical species is applied and then withdrawn. In this case, a new probe may be required or the old one may need to be cleaned.

Temperature variations within the enclosure may result in static beam-bending, particularly when two dissimilar materials with differing thermal expansion coefficients are used to form the cantilevered beam. Compensation of beam-bending due to temperature may be accomplished by combining, for example, measurements from a separate, non-exposed cantilevered beam, an untreated cantilevered beam, or with a temperature measuring device such as a resistive temperature device (RTD), thermocouple, or diode-based temperature sensor during analysis of the signals.

The cantilevered beam may be heated to initialize or re-initialize the treated portion of the cantilevered beam, such that a new reading or an accurate first reading may be made, as seen at block 555. The cantilevered beam may be heated by a heater coupled to the cantilevered beam, such as with a resistive heater or a heat lamp. The cantilevered beam may be cleaned, for example, with successive dips in acetone, ethanol, or with an oxygen plasma. The cantilevered beam may be re-initialized, for example, by reversing any chemical reactions that have occurred at the treated portions.

Figure 6:
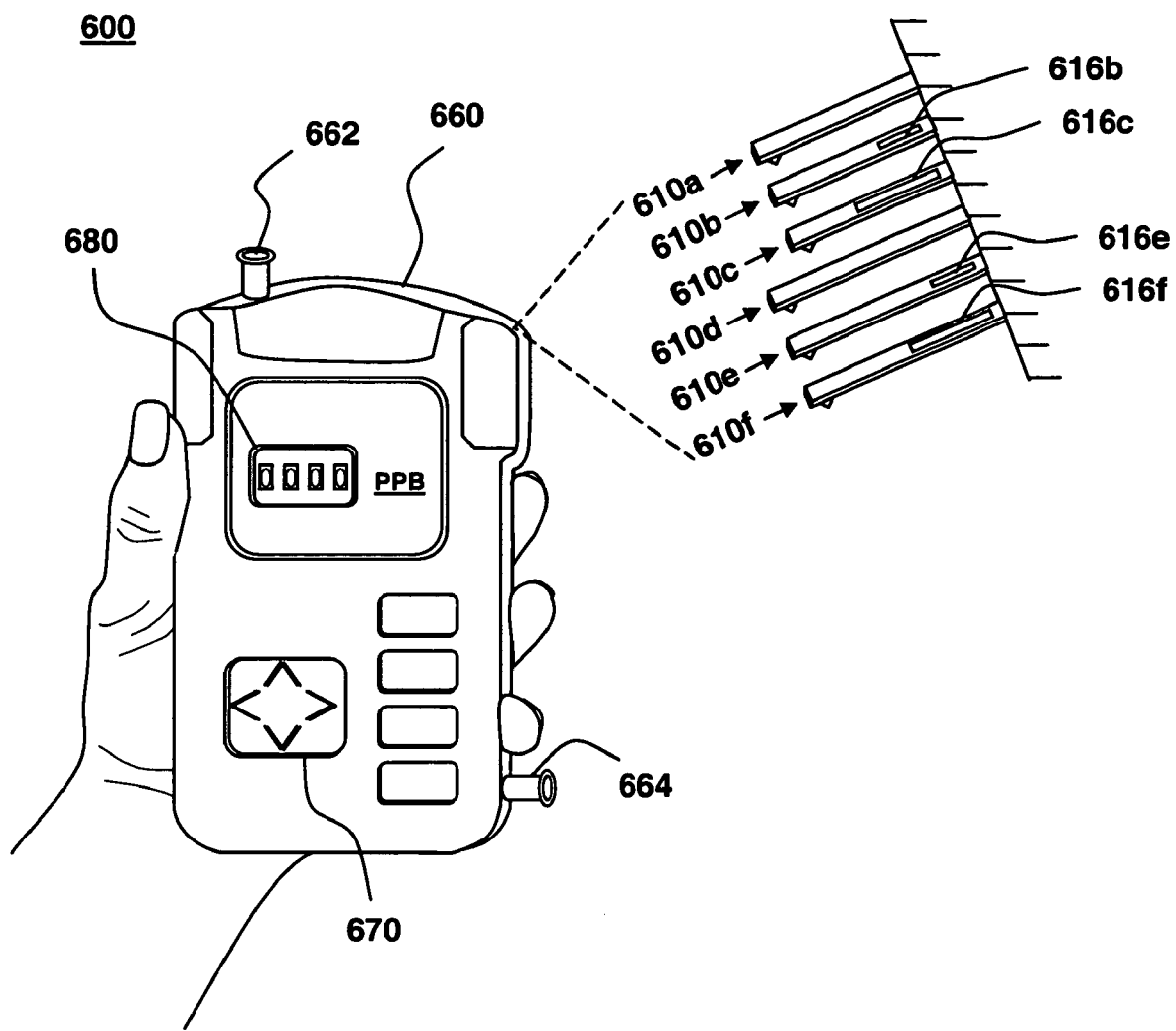
FIG. 6 illustrates a handheld system for sensing a chemical species, in accordance with one embodiment of the current invention.

FIG. 6 shows a handheld system for sensing a chemical species, in accordance with one embodiment of the present invention at 600. Handheld chemical species detection system 600 includes at least one cantilevered beam 610 with at least one cantilevered beam including a treated portion 616, a mechanical stop coupled to a base end of each cantilevered beam 610, and a piezoelectric drive-sense mechanism coupled to each cantilevered beam 610. A chemical species such as mercury, hydrogen, an alcohol, water vapor, a chemical element, a chemical compound, an organic material, an inorganic material, a biological material, a bioactive agent, or a toxin may be sensed based on an oscillation amplitude of each of the at least one cantilevered beams 610 when the treated portions 616 of at least one cantilevered beam is exposed to the chemical species. A positioning element may be coupled between the base end of at least one cantilevered beam 610 and the mechanical stop. The positioning element may adjust the position of the mechanical stop to engage cantilevered beams 610 and to maintain an oscillation of at least one cantilevered beam 610 at a nominally constant amplitude. The mechanical stops and positioning elements are not shown in the figure for clarity. A heater may be coupled to the cantilevered beams to re-initialize treated portions 616. The drive mechanisms and the sense mechanisms associated with each cantilevered beam 610 are not shown for clarity.

In one example, cantilevered beams 610 are driven into oscillation with a drive mechanism coupled to each beam. The free end of each cantilevered beam 610 is tapped against a mechanical stop coupled to the base end of each cantilevered beam. The amplitudes of the oscillating cantilevered beams are measured with a sense mechanism coupled to each beam. A treated portion of the cantilevered beams is exposed to a chemical species, and cantilevered beams 610 bend when exposed. The amplitudes of oscillating cantilevered beams 610 are measured, and the chemical species is determined based on the amplitudes of oscillating cantilevered beams 610.

In another example, the positions of one or more mechanical stops are adjusted with positioning elements coupled to the mechanical stops to maintain oscillating cantilevered beams 610 at a nominally constant amplitude, and the chemical species is determined based on the positions of the mechanical stops.

In another example, the frequencies of oscillating cantilevered beams 610 are measured, and the chemical species is determined based on the measured frequencies. One or more measurement techniques may be combined for accurate chemical-species determination.

The chemical species, typically carried in the air, in a liquid, or in a controlled gas environment, enters enclosure 660 through an inlet port 662 and may exit through outlet port 664. Command and data entry input devices 670 such as buttons, keypads, or softkeys, allow the selection of the function and operation of the sensor. Results of measurements are displayed on an output device 680 such as an LCD, or communicated to another analysis system through a wired communication port such as a universal serial bus (USB) port or through a wireless communication protocol.

An array of cantilevered beams 610a-610f can be used to obtain a higher level of accuracy and confidence than a single cantilevered beam. The array can also provide for redundancy. Cantilevered beams 610a-610f can have different lengths and dimensions to separate the resonant frequencies. Cantilevered beams 610a-610f can have untreated portions and treated portions 616b, 616c, 616e and 616f to provide additional sensitivity or selectivity to multiple chemical species within the same unit. Multiple cantilevered beams can be configured to cancel out the effects, for example, of water vapor.

What is claimed is:

1. A system for sensing a chemical species, comprising:
    an array of cantilevered beams, at least a first cantilevered beam comprising a treated portion;
    each cantilevered beam comprising a unitary piezoelectric element that defines a piezoelectric drive mechanism and a piezoelectric sense mechanism for driving and sensing the cantilever;
    wherein the first cantilevered beam is driven into oscillation, and the chemical species is determined based on changes measured by the sense mechanism of the first cantilevered beam when the treated portion of the first cantilevered beam is exposed to the chemical species.

2. The system of claim 1 wherein the cantilevered beam comprises a layer selected from the group consisting of silicon, polysilicon, silicon nitride, a metal zinc oxide, PZT, a piezoelectric material, a piezoresistive material, a dielectric material, a polymer, and combinations thereof.

3. The system of claim 1 wherein the treated portion of the first cantilevered beam comprises a coating selected from the group consisting of a gold layer, a palladium layer, an alcohol-absorbent polymer, a water-absorbent material, a chemical-sensitive layer, a biosensitive material, and a thiol.

4. The system of claim 1 wherein the chemical species is selected from the group consisting of mercury, hydrogen, an alcohol, water vapor, a chemical element, a chemical compound, an organic material, an inorganic material, a biological material, a DNA strand, a bioactive agent, and a toxin.

5. The system of claim 1 further comprising: an enclosure enclosing the array, the enclosure having an inlet port for the ingression of the chemical species and an outlet port for the egression of the chemical species.

6. The system of claim 1 further comprising: a heater coupled to the first cantilevered beam.

7. The system of claim 1, wherein the treated portion is configured to detect the chemical species.

8. The system of claim 1, further comprising control circuitry coupled to the piezoelectric drive mechanisms and the piezoelectric sense mechanisms of the cantilevered beams in the array.

9. The system of claim 1, further comprising drive-sense circuitry coupled to the piezoelectric drive mechanisms and the piezoelectric sense mechanisms of the cantilevered beams in the array.

10. The system of claim 1, wherein the array of cantilevered beams comprises an untreated cantilevered beam.

11. The system of claim 1, wherein the array of cantilevered beams comprises a reference cantilevered beam.

12. The system of claim 1, wherein at least two cantilevered beams in the array of cantilevered beams have a different physical property.

13. The system of claim 12, wherein the physical property comprises length.

14. The system of claim 12, wherein the physical property comprises a physical dimension.

15. The system of claim 1, wherein at least a portion of the cantilevered beams in the array of cantilevered beams have different resonant frequencies.

* * * * *